United States Patent [19]  [11]  4,440,891

Taylor et al.  [45]  Apr. 3, 1984

[54] HALOGEN-CONTAINING POLYMERS STABILIZED WITH ORGANIC ANTIMONY COMPOUND AND AN ORTHO MERCAPTO PHENOL COMPOUND

[75] Inventors: Jack D. Taylor, Katy, Tex.; Kenneth V. Smith, Cincinnati, Ohio

[73] Assignee: Carstab Corporation, Chicago, Ill.

[21] Appl. No.: 406,584

[22] Filed: Aug. 9, 1982

[51] Int. Cl.$^3$ .............................................. C08K 5/37
[52] U.S. Cl. ................................. 524/177; 524/289; 524/330; 524/331; 524/333; 252/400 A
[58] Field of Search ............... 524/177, 289, 330, 331, 524/333; 252/400 A

[56] References Cited

U.S. PATENT DOCUMENTS 3,875,084 4/1975 Weil ..................................... 524/144
4,029,618 6/1977 Dieckmann .......................... 524/177
4,314,934 2/1982 Smith et al. ......................... 524/180
4,367,304 1/1983 Michaelis et al. ................... 524/289

FOREIGN PATENT DOCUMENTS 827393 2/1960 United Kingdom .

*Primary Examiner*—Veronica P. Hoke
*Attorney, Agent, or Firm*—Gerald K. White; Richard J. Sheridan

[57] ABSTRACT

Compositions which are effective in stabilizing polymers against the deteriorative effects of heat are provided comprising (1) an organic antimony compound or mixture of organic antimony compounds and (2) an organic compound or mixture of organic compounds having an aromatic ring which is substituted with hydroxy (—OH) and mercapto (—SH) groups ortho to each other. Also provided are polymer compositions containing said stabilizers and articles of manufacture made from said stabilized polymer compositions.

6 Claims, No Drawings

HALOGEN-CONTAINING POLYMERS STABILIZED WITH ORGANIC ANTIMONY COMPOUND AND AN ORTHO MERCAPTO PHENOL COMPOUND

FIELD OF INVENTION

This invention relates to new and useful polymer stabilizer compositions comprising: (1) an organic antimony compound or mixture of organic antimony compounds and (2) an organic compound or mixture of organic compounds having an aromatic ring which is substituted with a hydroxyl (—OH) group and a mercapto (—SH) group ortho to each other. Additionally, this invention relates to polymer compositions comprising: (1) an organic polymer, more particularly a halogenated organic polymer, (2) an organic antimony compound or mixture of organic antimony compounds and (3) an organic compound or mixture of organic compound having an aromatic ring which is substituted with a hydroxyl (—OH) group and a mercapto (—SH) group ortho to each other. Further, this invention relates to articles of manufacture, e.g. pipe, made from polymer compositions comprising: (1) an organic polymer, more particularly a halogenated organic polymer, (2) an organic antimony compound or mixture of organic antimony compounds and (3) an organic compound or mixture of organic compounds having an aromatic ring which is substituted with a hydroxy (—OH) group and a mercapto (—SH) group ortho to each other.

BACKGROUND OF THE INVENTION

It is well known that various organic polymers undergo deterioration of physical properties and color changes during processing and during exposure of the formed polymer products to various and use environmental conditions. This deterioration of physical properties and color change is particularly pronounced in some polymers (e.g. halogenated polymers) upon their exposure to heat during processing, particularly the processing into formed articles of commerce. Undesirable color changes are observed to occur at the early stages (e.g. within the first 5 to 10 minutes) of the elevated temperature processing of the polymer as well as during the prolonged exposure of the polymer to heat during processing. Sometimes haziness or cloudiness accompany the color changes of the polymer and is particularly undesirable where clear or colorless products are needed. In many methods for making a polymer into a finished product the polymer remains in the processing apparatus, exposed to high temperatures, for a short period of time and therefore the color change or discoloration of the polymer resulting from prolonged exposure to heat during processing becomes only a minor consideration. The color change of the polymer during such short exposure to heat during processing has become known as early color and is of importance in the shaping of polymers into various products (e.g. pipe), particularly products which are to be light in color.

Early color is often manifested in various degrees of yellowing of the polymer, although other coloration has also been observed in early color problems. The problem of early color has received increasing attention in recent years and has become a significant consideration in the stabilization of polymers. However, there remains considerable need for improvement of the early color heat stabilization, as well as the long term heat stabilization, of polymers.

In the heat stabilization of organic polymers (e.g. halogen containing organic polymers) early color and long term color formation have been attacked by the art with various stabilizers, mixtures of stabilizers and stabilizer compositions. Organoantimony compounds have been used by the art alone or in combination with various other materials. Such organoantimony compounds are disclosed in, for example, U.S. Pat. Nos. 2,680,726; 2,684,956; 3,340,285; 3,399,220; 3,466,261 and 3,530,158. Vinyl halide polymers are also known to be stabilized against heat by reacting them with mercapto-phenolic compounds (see U.S. Pat. No. 3,875,084). These mercapto-phenolic compounds have the formula:

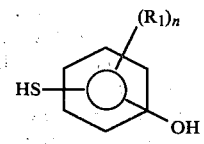

in which each $R_1$ is independently selected from hydrocarbyl, nitro and halogen; and n is 0 to 4. However, it has been found that these mercapto-phenolic compounds are, in fact, very poor stabilizers for vinyl halide resins. They produce a pink color when mixed with the polymers and the resulting mixture is subjected to heat.

SUMMARY OF THE INVENTION

There has now been found a surprisingly highly effective composition for stabilizing organic polymers which overcomes many of the disadvantages of prior art stabilizers and which is effective in the early color stabilization of organic polymers during processing. Additionally, there have been surprisingly found organic polymer compositions which have improved resistance to early color formation during processing. In accordance with this invention there is provided a stabilizer composition comprising: (1) an organic antimony compound or mixture of organic antimony compounds having at least one antimony atom and which has at least one antimony to sulfur to carbon linkage and (2) an organic compound or mixture of organic compounds having at least one carbocyclic aromatic ring which has bonded directly thereto a total of from two to six hydroxyl (—OH) and mercapto (—SH) groups with the proviso that at least one hydroxyl group and one mercapto group are bonded directly to adjacent ring carbon atoms. Further, there is now provided in accordance with this invention an organic polymer composition, having improved resistance to early color formation during processing, comprising, (1) an organic polymer normally susceptible to heat induced deterioration or discoloration, (2) an organic antimony compound or mixture of organic antimony compounds having at least one antimony atom and which has at least one antimony to sulfur to carbon linkage and (3) an organic compound or mixture of organic compounds having at least one carbocyclic aromatic ring which has bonded directly thereto a total of from two to six hydroxyl (—OH) and mercapto (—SH) groups with the proviso that at least one hydroxyl group and one mercapto group are bonded directly to adjacent ring carbon atoms. Additionally, there is now provided in accordance with this invention articles of manufacture, e.g. pipe, comprising: (1) an organic polymer, more particularly a halogenated organic polymer, (2) an organic antimony compound or mixture of organic antimony compounds having at least one antimony atom and which has at least one antimony to sulfur to carbon linkage and (3) an organic compound or mixture of organic compounds having at least one carbocyclic aromatic ring which has bonded directly thereto a total of from two to six hydroxyl and mercapto groups, with the proviso that at least one hydroxyl group and one mercapto group are bonded directly to adjacent ring carbon atoms.

DESCRIPTION OF THE INVENTION

The stabilizer compositions in accordance with this invention have unexpectedly been found to be highly effective in the stabilization of organic polymers exposed to heat during processing. More especially the stabilizer compositions of this invention have been unexpectedly found to be highly effective in the early color stabilization of organic polymers exposed to heat during processing (i.e. to be highly effective in reducing or preventing discoloration of an organic polymer during the early stages of the exposure of the organic polymer to heat during processing). Additionally, there has now been unexpectedly found in accordance with this invention advantageous polymer compositions having improved stability, more particularly improved resistance to early color formation upon exposure to heat during processing.

In accordance with this invention, there are now provided stabilizer compositions comprising: (1) an organic antimony compound or mixture of organic antimony compounds having at least one antimony atom and which has at least one antimony to sulfur to carbon linkage and (2) an organic compound or mixture of organic compounds having at least one carbocyclic aromatic ring which has bonded directly thereto a total of from two to six hydroxyl and mercapto groups, with the proviso that at least one hydroxyl group and one mercapto group are bonded directly to adjacent ring carbon atoms. Further, in accordance with this invention there are now provided polymer compositions comprising: (1) an organic polymer normally susceptible to deterioration or discoloration upon exposure to heat, (2) an organic antimony compound or mixture of organic antimony compounds having at least one antimony atom and which has at least one antimony to sulfur to carbon linkage and (3) an organic compound or mixture of organic compounds having at least one carbocyclic aromatic ring which has bonded directly thereto a total of from two to six hydroxyl and mercapto groups, with the proviso that at least one hydroxyl group and one mercapto group are bonded directly to adjacent ring carbon atoms. Additionally, in accordance with this invention there are now provided articles of manufacture, e.g. pipe comprising: (1) an organic polymer, more particularly a halogenated organic polymer, (2) an organic antimony compound or mixture of organic antimony compounds having at least one antimony atom and which has at least one antimony to sulfur to carbon linkage and (3) an organic compound or mixture of organic compounds having at least one carbocyclic aromatic ring which has bonded directly thereto a total of from two to six hydroxyl and mercapto groups, with the proviso that at least one hydroxyl group and one mercapto group are bonded directly to adjacent ring carbon atoms.

The organic antimony compounds useful in the practice of this invention contain at least one antimony atom and at least one antimony to sulfur to carbon, i.e. Sb—S—C linkage. More particularly, the antimony compounds useful in the invention contain an antimony to sulfur to carbon linkage wherein the sulfur to carbon, i.e. —S—C, part of each Sb—S—C linkage is derived from the group consisting of mercaptides, mercapto acids, mercaptoesters, i.e. the reaction produce of a mercaptoacid and an alcohol, mercaptoalkyl esters of carboxylic acids, i.e. the reaction product of a mercaptoalcohol with a carboxylic acid, and mixtures thereof.

The organic antimony compounds useful in this invention comprise compounds having the formula:

or the formula

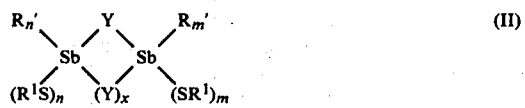

wherein

R is selected from the group consisting of alkyl, aryl, cycloalkyl, cycloalkenyl, aralkyl, alkaryl, and alkenyl;

$R^1$ is selected from the group consisting of alkyl, aryl, cycloalkyl, cycloalkenyl, aralkyl, alkaryl, alkenyl,

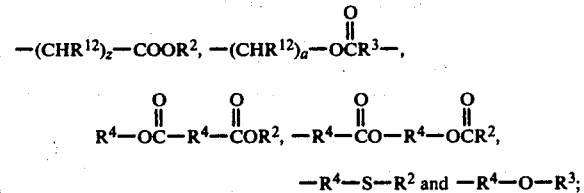

$$-R^4-S-R^2 \text{ and } -R^4-O-R^3;$$

$R^2$ is hydrogen, alkyl, aryl, alkenyl, cycloalkyl or alkoxyalkyl;

$R^3$ is alkyl, aryl, cycloalkyl or alkenyl;

$R^{12}$ is —H, alkyl, aryl, alkenyl, cycloalkyl; or alkyl, aryl, alkenyl or cycloalkyl substituted with —OH, —OR$^1$,

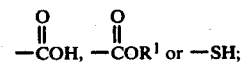

Y is selected from the group consisting of

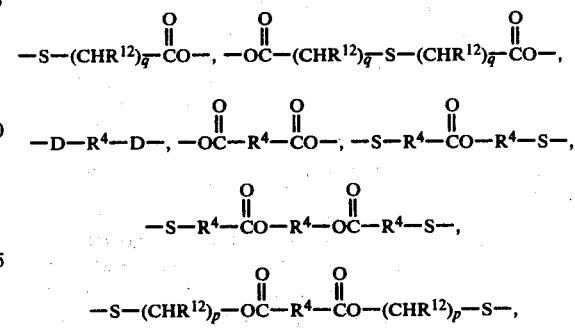

-continued

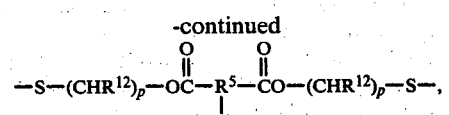

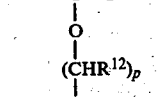

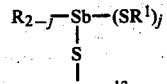

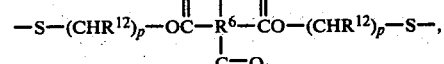

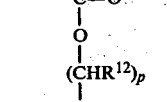

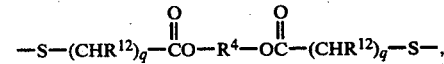

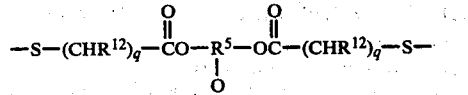

and

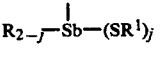

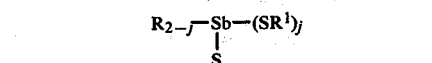

$R^4$ is unsubstituted alkylene, arylene or alkenylene, or alkylene, arylene or alkenylene substituted with one or two R, $-OR^2$,

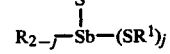

$R^5$ is a trivalent alkyl or aryl radical;
$R^6$ is a tetravalent alkyl or aryl radical;
$R^{40}$ is unsubstituted alkylene, arylene or alkenylene; or alkylene substituted with one or two

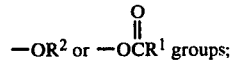

D is oxygen or sulfur;
i = 1, 2 or 3;
j = 1 or 2;
m = 1 or 2 and m' = 0 or 1;
n = 1 or 2 and n' = 0 or 1;
x is 0 or 1 with the proviso that when x = 0 then m + m' = 2 and n + n' = 2, and when x = 1 then m = 1, m' = 0, n = 1 and n' = 0;
z is 1, 2 or 3;
a is 2, 3 or 4;
q is 1, 2 or 3; and
p is 2, 3 or 4; and The organic compounds useful in the practice of this invention have at least one carbocyclic aromatic ring which has bonded directly thereto a total of from two to six hydroxyl, i.e. —OH, or mercapto, i.e. —SH, groups, with the proviso that at least one hydroxyl group and one mercapto group are bonded directly to adjacent ring carbon atoms. Preferably, the carbocyclic aromatic ring or rings in the organo compounds is phenyl or naphthyl.

The organic compounds useful in this invention more particularly comprise compounds having the formula:

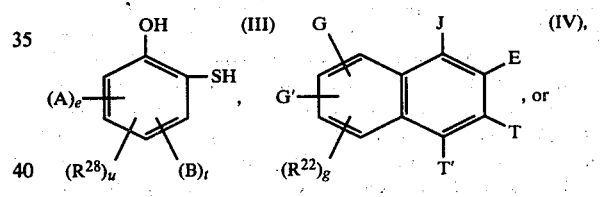

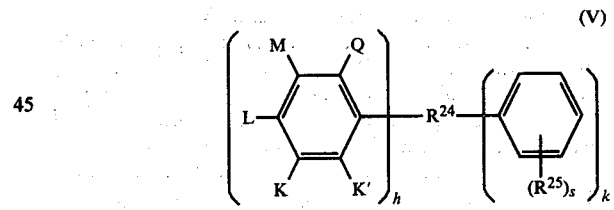

wherein
A is —H, —OH or —SH
B is —H, —OH or —SH
J is —H, —SH, —OH or $R^{26}$
E is —H, —OH, —SH or $R^{26}$
T is —H, —SH, —OH or $R^{26}$
T' is —H, —OH, —SH or $R^{26}$
G is —H, —OH or —SH
G' is —H, —SH or —OH
K is —H, —SH, —OH or $R^{23}$
K' is —H, —OH, —SH or $R^{23}$
L is —H, —SH, —OH or $R^{23}$
M is —H, —SH, —OH or $R^{23}$
Q is —H, —SH, —OH or $R^{23}$
$R^{28}$ is alkyl, aryl, alkenyl, alkaryl, cycloalkyl, alkoxy or halogen,
$R^{26}$ is alkyl, alkenyl or halogen
$R^{22}$ is alkyl, alkenyl or halogen
$R^{23}$ is alkyl, alkenyl or halogen
$R^{24}$ is alkylene or alkenylene $R^{25}$ is alkyl, alkenyl, halogen, —SH or —OH
e is 1 or 2;
t is 1 or 2;
u is 0, 1, 2 or 3;
s is 0, 1, 2 or 3;
g is 0, 1, 2 or 3;
h is 1, 2, 3 or 4;
k is 0, 1, 2 or 3;
h+k is 2, 3 or 4;
e+t+u is 2, 3 or 4;
with the proviso that (1) in formula (IV) two of groups J, E, T and T' must be an OH group and an SH group bonded directly to adjacent ring carbon atoms, and (2) in formula (V) two of groups K, K', L, M and Q must be an OH group and an SH group bonded directly to adjacent ring carbon atoms.

As used herein the term alkyl represents monovalent straight or branched chain hydrocarbon radicals containing, for example, 1 to 20 carbon atoms. The term aryl refers to monovalent $C_6$—$C_{10}$ aromatic rings such as benzene and naphthalene. The term alkenyl refers to monovalent straight or branched chain $C_2$ to $C_{20}$ hydrocarbon radicals containing at least one double bond. The term aralkyl represents a monovalent $C_1$ to $C_{20}$ hydrocarbon radical having attached thereto an aryl radical. The term alkaryl refers to monovalent aryl radicals having attached thereto at least one $C_1$-$C_{20}$ alkyl radical. The term cycloalkyl represents monovalent $C_3$-$C_8$ saturated cycloaliphatic radicals, and the term cycloalkenyl represents $C_5$-$C_8$ cycloaliphatic radicals containing at least one double bond.

The organic antimony compounds may all be prepared by methods well known in the art. For example, methods for preparing the organic antimony compounds are disclosed in U.S. Pat. Nos. 2,680,726; 2,684,956; 3,340,285; 3,399,220; 3,466,261 and 3,530,158.

In accordance with the practice of this invention, the organic compounds according to formulas (III), (IV) and (V) have a vicinal OH/SH arrangement (i.e. have an —OH group and an —SH group on adjacent ring carbon atoms). However, the organic compounds according to formulas (III), (IV) and (V) may have, in addition to the first vicinal OH/SH arrangement on the ring, further vicinal OH/SH arrangements on the ring. Such additional vicinal OH/SH arrangements on the ring may be separated from the first vicinal OH/SH arrangement on the ring by one or more ring carbon atoms or may occupy a position on the ring adjacent to the first vicinal OH/SH arrangement on the ring or may include the OH or SH or both OH and SH of the first vicinal OH/SH arrangement. These arrangements of OH groups and SH groups may be illustrated by the following examples. In formula (III) the ring carbon atoms may be numbered consecutively in a clockwise manner starting at the carbon atom to which the OH group is attached as being number one. A compound according to formula (III) having the single vicinal OH/SH arrangement shown therein would have the OH group and SH group at ring carbon atoms numbered one and two respectively. Other compounds according to formula (III) having more than one vicinal OH/SH arrangement may, for example, include such compounds according to formula (III) having a further OH group at ring carbon number four and a further SH group at ring carbon number five, a compound according to formula (III) having a further OH group at ring carbon number three, or a compound according to formula (III) having a further SH group at ring carbon number 6. In a like manner, multiple vicinal OH/SH arrangements may be present in compounds according to formulas (IV) and (V) in the practice of this invention.

The preferred organic antimony compounds useful in this invention are those compounds according to formula (I) where i=3, and $R^1$ is —$(CHR^{12})_z$—$COOR^2$ where $R^{12}$ is —H or alkyl, z=1 or 2 and $R^2$ is alkyl; those compounds according to formula (II) where Y is

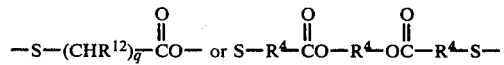

where $R^{12}$ is —H or alkyl, q=1 or 2, $R^4$ is alkylene, n' and m' are each 0, n and m are each 2; x=0; and $R^1$ is —$(CHR^{12})_z$—$COOR^2$ where $R^{12}$ is —H or alkyl, z=1 or 2 and $R^2$ is alkyl.

Organic antimony compounds useful in the practice of this invention include, but are not limited to the following compounds:

$CH_3Sb(SC_4H_9)_2$ $Sb(SC_8H_{17})_3$ $(C_8H_{17})_2SbSC_6H_5$ $C_6H_5Sb(SCH_2C_6H_5)_2$ $C_6H_5$—$CH_2$—$Sb(SC_6H_4CH_3)_2$

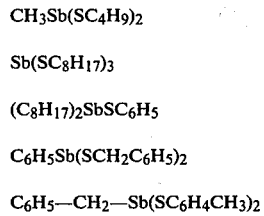

-continued $$(C_7H_{15}\overset{O}{\underset{\|}{C}}OCH_2CH_2S)_2-Sb-S-CH_2\overset{O}{\underset{\|}{C}}O-Sb-(SCH_2CH_2O\overset{O}{\underset{\|}{C}}C_7H_{15})_2$$

$$C_8H_{17}S-\underset{\underset{CH_3}{|}}{Sb}-SCH_2\overset{O}{\underset{\|}{C}}OC_6H_{12}O\overset{O}{\underset{\|}{C}}CH_2S-\underset{\underset{CH_3}{|}}{Sb}-SC_8H_{17}$$

$$CH_3\overset{O}{\underset{\|}{C}}OCH_2CH_2S-\underset{\underset{CH_2C_6H_5}{|}}{Sb}-SCH_2CH_2CH_2\overset{O}{\underset{\|}{C}}OC_6H_4O\overset{O}{\underset{\|}{C}}CH_2CH_2CH_2S-\underset{\underset{CH_2C_6H_5}{|}}{Sb}-SCH_2CH_2O\overset{O}{\underset{\|}{C}}CH_3$$

$$C_{10}H_{21}O\overset{O}{\underset{\|}{C}}CH_2CH_2S-\underset{\underset{C_{18}H_{37}}{|}}{Sb}-SC_6H_4\overset{O}{\underset{\|}{C}}O-\underset{\underset{C_{18}H_{37}}{|}}{Sb}-SCH_2CH_2\overset{O}{\underset{\|}{C}}OC_{10}H_{21}$$

Organic compounds according to formula (III) are preferably used in the practice of this invention. More preferably the compounds according to formula (III) used in the practice of this invention are ortho hydroxythiophenol and lower alkyl (i.e. $C_1$ to $C_9$ alkyl) substituted ortho hydroxythiophenols.

As examples of organic compounds usable in the practice of this invention, there are included, but are not limited to, the following compounds:

1-hydroxy-2-mercaptobenzene (ortho hydroxythiophenol)
1,3-dihydroxy-2-mercapto benzene
1,4-dihydroxy-2-mercapto benzene
1,5-dihydroxy-2-mercapto benzene
1,6-dihydroxy-2-mercapto benzene
1,3,4-trihydroxy-2-mercapto benzene
1,3,5-trihydroxy-2-mercapto benzene
1,3,6-trihydroxy-2-mercapto benzene
1,4,5-trihydroxy-2-mercapto benzene
1,4,6-trihydroxy-2-mercapto benzene
1,5,6-trihydroxy-2-mercapto benzene
1,3,4,5-tetrahydroxy-2-mercapto benzene
1,3,4,6-tetrahydroxy-2-mercapto benzene
1,4,5,6-tetrahydroxy-2-mercapto benzene
1,3,4,5,6-pentahydroxy-2-mercapto benzene
1-hydroxy-2,3-dimercapto benzene
1-hydroxy-2,4-dimercapto benzene
1-hydroxy-2,6-dimercapto benzene
1-hydroxy-2,3,5-trimercapto benzene
1-hydroxy-2,3,6-trimercapto benzene
1-hydroxy-2,3,4,5-tetramercapto benzene
1-hydroxy-2,3,4,6-tetramercapto benzene
-hydroxy-2,3,4,5,6-pentamercapto benzene
1,3-dihydroxy-2,4-dimercapto benzene
1,3-dihydroxy-2,6-dimercapto benzene
1,3,5-trihydroxy-2,4-dimercapto benzene
1,3,5-trihydroxy-2,4,6-trimercapto benzene
1-hydroxy-2-mercapto-4-methyl benzene
1,3-dihydroxy-2-mercapto-5,6-dioctyl benzene
1-hydroxy-2-mercapto-4-phenyl benzene
1-hydroxy-2-mercapto-5-cyclohexyl benzene
1,3-dihydroxy-2-mercapto-4-butyl benzene
1-hydroxy-2,6-dimercapto-4-chloro benzene
1-hydroxy-2-mercapto-4,5-dichloro benzene
1-hydroxy-2-mercapto-4-chloro-6-hexyl benzene
1-hydroxy-2-mercapto-3-ethyl-5 isopropyl benzene Further examples of organic compounds usable in the practice of this invention include, but are not limited to, compounds according to formula (IV) as shown in the following Table I:

TABLE I (IV)

Structure: naphthalene with substituents G, J, E, G', T, T', $(R^{22})_g$

| D | E | T | T' | $R^{22}$ | G | G' | g |
|---|---|---|---|---|---|---|---|
| OH | SH | — | — | — | — | — | 0 |
| — | OH | SH | — | — | — | — | 0 |
| OH | SH | OH | — | — | — | — | 0 |
| SH | OH | OH | — | — | — | — | 0 |
| OH | SH | — | OH | — | — | — | 0 |
| SH | OH | — | SH | — | — | — | 0 |
| OH | SH | — | — | — | OH | SH | 0 |
| OH | SH | OH | OH | — | — | — | 0 |
| OH | SH | — | —$CH_3$ | — | — | — | 0 |
| SH | OH | — | —$C_2H_5$ | — | — | — | 0 |
| — | OH | SH | — | —$C_6H_{13}$ | — | — | 1 |
| OH | SH | — | —$C_4H_9$ | —$C_8H_{17}$ | — | — | 2 |
| SH | OH | —$C_4H_9$ | — | —$C_4H_9$ | OH | — | 1 |
| OH | SH | — | OH | $C_2H_3$ | — | — | 1 |
| — | SH | OH | — | $C_{12}H_{25}$ | SH | OH | 1 |
| OH | SH | —$CH_3$ | —$CH_3$ | — | — | — | 0 |
| OH | SH | — | — | Cl | — | — | 1 |
| OH | SH | — | Cl | — | — | — | 0 |
| OH | SH | — | Cl | $C_{18}H_{35}$ | — | — | 1 |
| OH | SH | — | Cl | — | SH | — | 0 |
| —$C_2H_5$ | SH | OH | —$C_2H_5$ | — | — | — | 0 |
| Cl | OH | SH | Cl | — | — | — | 0 |
| OH | SH | — | — | — | OH | OH | 0 |

Additional examples of compounds usable in the practice of this invention include, but are not limited to, the compounds according to formula (V) shown in the following Table II:

TABLE II (XII)

Structure: benzene ring with substituents M, Q, L, K, K', linked via $R^{24}$ to phenyl ring with $(R^{25})_s$

| K | K' | L | M | Q | $R^{25}$ | $R^{24}$ | h | k | s |
|---|---|---|---|---|---|---|---|---|---|
| — | — | OH | SH | — | — | $CH_2$ | 1 | 1 | 0 |
| — | — | OH | SH | — | — | $CH_2$ | 2 | 0 | 0 |

TABLE II-continued $$\left( \begin{array}{c} M \quad Q \\ L \underset{K \quad K'}{\underset{|}{\bigcirc}} \end{array} \right)_h R^{24} \left( \underset{(R^{25})_s}{\bigcirc} \right)_k \quad (XII)$$

| K | K' | L | M | Q | R²⁵ | R²⁴ | h | k | s |
|---|---|---|---|---|---|---|---|---|---|
| — | — | — | OH | SH | — | CH₂ | 2 | 0 | 0 |
| — | — | — | SH | OH | — | CH₂ | 2 | 0 | 0 |
| OH | — | SH | OH | — | — | C(CH₃)₂ | 1 | 1 | 0 |
| SH | OH | — | SH | OH | — | C₄H₈ | 1 | 1 | 0 |
| — | — | OH | SH | OH | — | C₂H₂ | 1 | 1 | 0 |
| SH | C₃H₇ | OH | C₃H₇ | — | Br | C₆H₁₂ | 1 | 1 | 2 |
| OH | — | SH | OH | SH | C₆H₁₃ | CH₂ | 1 | 1 | 1 |
| OH | CH₃ | SH | — | — | — | CH₂ | 2 | 0 | 0 |
| OH | OH | SH | OH | OH | C₈H₁₇ | CH₂ | 1 | 1 | 1 |
| — | — | SH | SH | OH | C₂H₅ | C(CH₃)₂ | 1 | 1 | 2 |
| CH₃ | — | — | OH | SH | — | CH(CH₂)₃ | 3 | 0 | 0 |
| — | — | OH | SH | — | C₃H₇ | Cl C₁₀H₂₄ | 1 | 1 | 1 |
| — | C₄H₉ | — | SH | OH | — | C(CH₂)₄ | 4 | 0 | 0 |
| C₈H₁₇ | — | C₈H₁₇ | OH | SH | CH₃ | C₄H₇(CH₃) | 1 | 1 | 1 |
| — | — | OH | SH | — | OH | C(CH₃)₂ | 1 | 1 | 1 |

In the stabilizer compositions of this invention the weight ratio of (a) the organic antimony compound or mixture of organic antimony compounds to (b) the organic compound or mixture of organic compounds may vary over a wide range. In general, the organic compound or mixture of organic compounds need only be employed in amounts which produce a synergistic effect in the resulting stabilizer composition. For example, there may be used a weight ratio of (a) the organic antimony compound or mixture of organic antimony compounds to (b) the organic compound or mixture of organic compounds of from about 400:1 to about 1:199, preferably from about 400:1 to about 1:100, more preferably from about 400:1 to about 1:20.

Various other substances may be added to or used in combination with the stabilizer compositions of this invention including, for example, an innocuous diluent (e.g. hydrocarbon oil or hydrocarbon solvent), plasticizer, wax, lubricant, release agent, antioxidant, U.V. stabilizer and fire retardant well-known in the art. Methods well-known in the art for physically combining two or more materials into a homogeneous blend (i.e. a thoroughly mixed composition) may be used to prepare the stabilizer compositions of this invention.

There is also now provided in accordance with this invention polymer compositions comprising (1) an organic polymer normally susceptible to thermal degradation and discoloration, (2) an organic antimony compound or mixture of organic antimony compounds having at least one antimony atom and which has at least one antimony to sulfur to carbon linkage and (3) an organic compound or mixture of organic compounds having at least one carbocyclic aromatic ring which has bonded directly thereto a total of from two to six hydroxyl and mercapto groups, with the proviso that at least one hydroxyl group and one mercapto group are bonded directly to adjacent ring carbon atoms.

In the practice of the polymer composition of this invention the combined amount by weight of the (a) organic antimony compound or mixture of organic antimony compounds and (b) organic compound or mixture of organic compounds used in the polymer composition may vary over a wide range, it being necessary only that there be employed an amount sufficient to produce the desired stabilizing effect. For example, there may be employed an amount by weight of the (a) an organic antimony compound or mixture of organic antimony compounds having at least one antimony atom and which has at least one antimony to sulfur to carbon linkage and (b) an organic compound or mixture of organic compounds having at least one carbocyclic aromatic ring which has bonded directly thereto a total of from two to six hydroxyl and mercapto groups, with the proviso that at least one hydroxyl group and one mercapto group are bonded directly to adjacent ring carbon atoms that is conventionally employed by the art for adding a stabilizer to a polymer, such as about 0.01% to about 10%, preferably about 0.10% to about 5%, more preferably about 0.25% to about 1.0%, all percentages being by weight based on the weight of the polymer composition of this invention. The ratio of the (a) an organic antimony compound or mixture of organic antimony compounds having at least one antimony atom and which has at least one antimony to sulfur to carbon linkage to (b) an organic compound or mixture of organic compounds having at least one carbocyclic aromatic ring which has bonded directly thereto a total of from two to six hydroxyl and mercapto groups, with the proviso that at least one hydroxyl group and one mercapto group are bonded directly to adjacent ring carbon atoms is as previously disclosed herein for the stabilizer composition of this invention.

Conventional methods well known in the art for blending together polymers and additives may be employed to prepare the polymer compositions of this invention. The organic antimony compound or mixture of organic antimony compounds having at least one antimony atom and which has at least one antimony to sulfur to carbon linkage and the organic compound or mixture of organic compounds having at least one carbocyclic aromatic ring which has bonded directly thereto a total of from two to six hydroxyl and mercapto groups, with the proviso that at least one hydroxyl group and one mercapto group are bonded directly to adjacent ring carbon atoms may be separately added to the polymer or they may be precombined and the combination added to the polymer. Other additives well known in the art, such as for example plasticizers, fillers, pigments, lubricants, antioxidants, fire retardants, U.V. stabilizers, antistatic agents and cross linking agents may be employed in the polymer composition of this invention.

Organic polymers normally susceptible to thermal deterioration (i.e. heat induced degradation) are generally useful in the practice of the polymer compositions of this invention. In view of their similar thermal behavior, i.e. discoloration, during elevated temperature processing and their similar capacity to dehydrohalogenate various halogen-containing organic polymers such as vinyl halide and vinylidene halide homopolymers and copolymers could be expected to be useful in the practice of this invention. Especially preferred to be used in the polymer composition of this invention is a homopolymer of copolymer or mixture thereof of a vinyl chloride or vinylidene chloride monomer. Mixtures of organic polymers, at least one of which is a homopolymer or copolymer of a vinyl halide or vinylidene halide monomer, may also be used in the practice of the polymer composition of this invention. Among the halogen containing organic polymers considered to be useful in the practice of the polymer composition of this invention there are included, for example, halogenated olefin homopolymers, halogenated olefin copolymers, vinyl halide homopolymers, vinyl halide copolymers, vinylidene halide homopolymers, vinylidene halide copolymers and polymer mixtures containing said halogen containing organic polymers.

As vinyl halide homopolymers, vinyl halide copolymers and polymer blends containing vinyl halide homopolymers, vinyl halide copolymers and polymer blends containing vinyl halide homopolymers or vinyl halide copolymers there, for example, include (1) polyvinyl chloride, polyvinylidene chloride, polyvinyl bromide, polyvinyl fluoride, polyvinylidene fluoride, (2) copolymers of vinyl chloride with a copolymerizable ethylenically unsaturated monomer such as vinylidene chloride, vinyl acetate, vinyl butyrate, vinyl benzoate, diethyl fumarate, diethyl maleate, other alkyl fumarates and maleates, vinyl propionate, methyl acrylate, 2-ethylhexyl acrylate, butyl acrylate, ethyl acrylate, and other alkyl acrylates, methyl methacrylate, ethyl methacrylate, butyl methacrylate, hydroxyethyl methacrylate and other alkyl methacrylates, methyl alpha chloroacrylate, styrene, vinyl ethers such as vinyl ethyl ether, vinyl chloroethyl ether, vinyl phenyl ether, vinyl ketones such as vinyl methyl ketone, vinyl phenyl ketone, 1-fluoro-1-chloroethylene, acrylonitrile, chloroacrylonitrile, allylidene diacetate, chloroallylidene diacetate, ethylene and propylene, and (3) polymer blends such as blends of polyvinyl chloride and polyethylene, polyvinyl chloride and chlorinated polyethylene, polyvinyl chloride and polymethyl methacrylate, polyvinyl chloride and polybutylmethacrylate, polyvinyl chloride and polystyrene, polyvinyl chloride and acrylonitrile-butadienestyrene copolymer, and polyvinyl chloride and polyethylene and polymethyl methacrylate. Typical vinyl halide copolymers include vinyl chloride-vinyl acetate (87-13), vinyl chloride-vinylidene chloride (95-5), vinyl chloride-diethylfumarate (95-5) vinyl chloride-trichloroethylene (95-5) and vinyl chloride 2-ethylhexylacrylate (80-20). The polymer blends comprise physical blends of at least two distinct polymeric species and contain from 25 to 95 weight percent of vinyl halide homopolymer. The vinyl halide copolymers ae copolymers comprising from 25 to 95 mole percent vinyl halide units.

Other halogen containing polymers may include, for example, chlorinated polyethylene having 14 to 75%, e.g. 27%, chlorine by weight, chlorinated natural and synthetic rubber, chlorinated polystyrene and rubber hydrochloride. The homopolymers and copolymers of vinyl chloride or vinylidene chloride and polymer mixtures containing said homopolymer or copolymers are preferred in the practice of the polymer composition of this invention.

There is also provided in accordance with this invention articles of manufacture, e.g. pipe, produced from a polymer composition comprising: (1) an organic polymer normally susceptible to thermal degradation and discoloration, (2) an organic antimony compound or mixture of organic antimony compounds having at least one antimony atom and which has at least one antimony to sulfur to carbon linkage and (3) an organic compound or mixture of organic compounds having at least one carbocyclic aromatic ring which has bonded directly thereto a total of from two to six hydroxyl and mercapto groups, with the proviso that at least one hydroxyl group and one mercapto group are bonded directly to adjacent ring carbon atoms. The articles of manufacture according to this invention may be made by any of the well known conventional techniques for forming polymer compositions into desired shapes.

This invention is further described by the following nonlimiting examples in which all amounts are by weight and all temperatures are in degrees Centigrade unless otherwise indicated. The following examples teach various stabilizer compositions according to this invention.

TABLE III

| Stabilizer No. | Organic Antimony Compound | Parts By Weight | Organic Compound | Parts By Weight |
|---|---|---|---|---|
| 1 | Sb(TO-8)$_3$[1] | 20.0 | OHTP[2] | 1.3 |
| 2 | Sb(TO-8)$_3$ | 10.0 | OHTP | 1.0 |
|   | Sb(TO-9)$_3$[3] | 10.0 |   |   |
| 3 | Sb(TO-9)$_3$ | 20.0 | OHTP | 1.0 |
| 4 | Sb(SC$_8$H$_{17}$)$_3$ | 20.0 | OHTP | 1.0 |
| 5 | Sb(MEO)$_3$[4] | 20.0 | OHTP | 1.0 |
| 6 | (TO-8)$_2$Sb(DBTG)Sb(TO-8)$_2$[5] | 20.0 | OHTP | 1.0 |
| 7 | Sb(TO-8)$_3$ | 10.0 | OHTP | 0.1 |
| 8 | Sb(TO-8)$_3$ | 10.0 | OHTP | 2.0 |
| 9 | Sb(TO-8)$_3$ | 40.0 | OHTP | 0.1 |
| 10 | Sb(TO-8)$_3$ | 40.0 | OHTP | 2.0 |
| 11 | Sb(TO-8)$_3$ | 20.0 | MNP[6] | 1.0 |
| 12 | Sb(TO-8)$_3$ | 20.0 | MTBP[7] | 1.0 |
| 13 | Sb(TO-8)$_3$ | 20.0 | MMBP[8] | 1.0 |

[1] TO-8 represents isooctyl thioglycolate
[2] OHTP is ortho hydroxy thiophenol
[3] TO-9 is isooctyl mercaptopropionate
[4] MEO is mercaptoethyloleate
[5] DBTG is diethyleneglycol bis thioglycolate
[6] MNP is 2-mercapto-4-n-nonyl phenol
[7] MTBP is 2-mercapto-4-t-butyl phenol
[8] MMBP is 2-mercapto-4-methyl-6-t-butyl phenol In the following examples a preliminary blend of the formulation indicated below is prepared on a low shear, low speed mixer and then the preliminary blend added to a two roll mill having the rolls at a temperature of 193° C. One roll is operated at 30 RPM and the other roll operated at 40 RPM. The milled blend consisting of the formulation without any added stabilizer degrades to a pink color during the first two minutes it is on the mill. Milled blends consisting of the formulation with 0.001–0.02 phr of the organic compound OHTP alone as added stabilizer also degrades to a pink color during the first two minutes they are on the mill. Thus, the organic compound OHTP alone as added stabilizer does not improve the early color of the formulation. Milled blends consisting of the formulation with 0.10–0.40 phr of organic antimony compounds in accordance with this invention as added stabilizers either alone or with OHTP do not degrade to a pink color during the first two minutes they are on the mill. Thus, two minutes after introducing the preliminary blend on the mill a resin sample is taken and then further resin samples are taken at one minute intervals. The whiteness of the roll side of each resin sample is measured on a Gardner Model XL-23 Tristimulus Colorimeter and the Whiteness Index determined in accordance with

| Material | Formulation Parts by Weight |
|---|---|
| Polyvinyl chloride[9] | 100.00 |
| OMYA 90T[10] | 3.00 |
| Titanium dioxide | 1.00 |
| Paraffin Wax[11] | 1.00 |
| Calcium stearate | 0.60 |
| AC 629A[12] | 0.15 |
| Stabilizer | as indicated below |

[9]Geon ® 103 EP-F-76 obtainable from B. F. Goodrich Chemical Co.
[10]A fine particle size $CaCO_3$ coated with calcium stearate
[11]Advawax ® 165 commercially available paraffin wax from Carstab Corporation
[12]An oxidized low molecular weight ethylene homopolymer obtainable from Allied Chemical Corporation Table of Stabilizing Results

| Example No. | Stabilizer | Am't of Stab. phr[13] | Numerical Rating After Minute[14] | | | | | | | | |
|---|---|---|---|---|---|---|---|---|---|---|---|
| | | | 2 | 3 | 4 | 5 | 6 | 7 | 8 | 9 | 10 |
| 1* | — | — | Pink | | | | | | | | |
| 2* | OHTP[10] | 0.01 | Pink | | | | | | | | |
| 3* | OHTP | 0.015 | Pink | | | | | | | | |
| 4* | OHTP | 0.02 | Pink | | | | | | | | |
| 5* | MNP | 0.01 | Pink | | | | | | | | |
| 6* | MTBP | 0.01 | Pink | | | | | | | | |
| 7* | MMBP | 0.01 | Pink | | | | | | | | |
| 8* | Sb(TO-8)$_3$ | 0.20 | 9 | 9 | 8 | 8 | 8 | 7 | 6 | 6 | 5 |
| 9 | Stab. no. 1 from Table III | 0.213 | 10 | 10 | 10 | 10 | 9 | 8 | 8 | 7 | 5 |
| 10 | Stab. no. 2 from Table III | 0.21 | 10 | 10 | 10 | 10 | 9 | 9 | 8 | 8 | 7 |
| 11* | Sb(TO-8)$_3$ Sb(TO-9)$_3$ | 0.10 0.10 | 9 | 8 | 8 | 7 | 7 | 7 | 6 | 5 | |
| 12 | Stab. no. 3 from Table III | 0.21 | 10 | 10 | 10 | 9 | 8 | 8 | 7 | 5 | |
| 13* | Sb(TO-9)$_3$ | 0.20 | 8 | 7 | 6 | 5 | | | | | |
| 14 | Stab. no. 4 from Table III | 0.21 | 10 | 10 | 10 | 9 | 8 | 7 | 6 | 5 | |
| 15* | Sb(SC$_8$H$_{17}$)$_3$ | 0.20 | 8 | 7 | 6 | 5 | | | | | |
| 16 | Stab. no. 5 from Table III | 0.21 | 10 | 10 | 10 | 9 | 8 | 8 | 6 | 5 | |
| 17* | Sb(MEO)$_3$ | 0.20 | 9 | 8 | 7 | 6 | 5 | | | | |
| 18* | (TO-8)$_2$Sb(DBTG)Sb(TO-8)$_2$ | 0.20 | 10 | 9 | 9 | 8 | 8 | 8 | 8 | 8 | 7 |
| 19 | Stab. no. 6 from Table III | 0.21 | 10 | 10 | 10 | 10 | 9 | 9 | 8 | 8 | 7 |
| 20 | Stab. no. 7 from Table III | 0.10 | 10 | 10 | 9 | 9 | 8 | 8 | 7 | 6 | 5 |
| 21 | Stab. no. 8 from Table III | 0.12 | 10 | 10 | 10 | 10 | 9 | 9 | 8 | 8 | 7 |
| 22 | Stab. no. 9 from Table III | 0.40 | 10 | 10 | 10 | 10 | 10 | 10 | 9 | 9 | 9 |
| 23 | Stab. no. 10 from Table III | 0.42 | 10 | 10 | 10 | 10 | 10 | 10 | 9 | 9 | 9 |
| 24 | Stab. no. 11 from Table III | 0.21 | 10 | 10 | 9 | 9 | 9 | 8 | 8 | 8 | 7 |
| 25 | Stab. no. 12 from Table III | 0.21 | 10 | 10 | 10 | 9 | 9 | 9 | 8 | 8 | 7+ |
| 25 | Stab. no. 13 from Table III | 0.21 | 10 | 10 | 10 | 10 | 9 | 9 | 9 | 8 | 8 |

[13]phr = parts per hundred parts of resin
[14]For the purpose of early color, numerical ratings are terminated when a value of 5 is reached.

ASTM 313-73 paragraphs 5.6 and 5.7 (ASTM Part 27, Page 846). Whiteness Index values are converted to numerical ratings in accordance with the following table. These ratings are shown in the table of results below.

| Numerical Rating | 10 | 9 | 8 | 7 | 6 | 5 |
|---|---|---|---|---|---|---|
| Whiteness Index | $\geq 50$ | 49 to 35 | 34 to 10 | 9 to −5 | −6 to −15 | $\leq -16$ |

Numerical ratings in the table illustrate that improved early color is obtained with the stabilizer compositions of this invention.

Other features, advantages and specific embodiments of this invention will become readily apparent to those exercising ordinary skill in the art after reading the foregoing disclosures. These specific embodiments are within the scope of the claimed subject matter unless otherwise expressly indicated to the contrary. Moreover, while a few specific embodiments of this invention have been described in considerable detail, variations and modifications of these embodiments can be effected without departing from the spirit and scope of the invention as disclosed and claimed.

What we claim and desire to protect by Letters Patent is:

1. A stabilizer composition for halogen containing organic polymer comprising:
   A. an organic antimony compound or mixture of organic antimony compounds having at least one antimony atom and at least one antimony to sulfur to carbon linkage wherein the sulfur to carbon part of each antimony to sulfur to carbon linkage is derived from the group consisting of mercaptides, mercapto acids, mercapto esters, mercapto alkyl esters of carboxylic acids, and mixtures thereof; and
   B. an organic compound or mixture of organic compounds having at least one carbocyclic aromatic ring which has bonded directly thereto a total of from two to six hydroxyl and mercapto groups, with the proviso that at least one hydroxyl group and at least one mercapto group are bonded directly to adjacent ring carbon atoms.

2. A stabilizer composition for halogen-containing organic polymers comprising:
   A. an organic antimony compound or mixture of organic antimony compounds is selected from compounds having the formula:

$(R)_{3-i}Sb-(-SR^1)_i$           (I)

or the formula

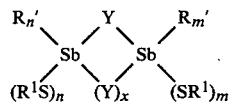     (II)

wherein
   R is selected from the group consisting of alkyl, aryl, cycloalkyl, cycloalkenyl, aralkyl, alkaryl, and alkenyl;
   $R^1$ is selected from the group consisting of alkyl, aryly cycloalkyl, cycloalkenyl, aralkyl, alkaryl, alkenyl,

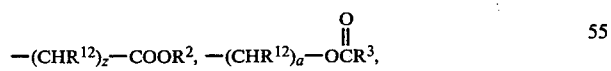

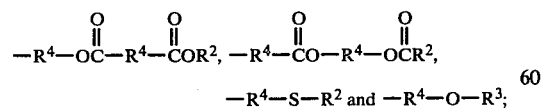

$R^2$ is hydrogen, alkyl, aryl, alkenyl, cycloalkyl or alkoxyalkyl;
   $R^3$ is alkyl, aryl, cycloalkyl or alkenyl;
   $R^{12}$ is —H, alkyl, aryl, alkenyl, cycloalkyl; or alkyl, aryl, alkenyl or cycloalkyl substituted with —OH, —OR$^1$,

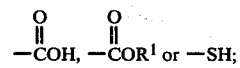

Y is selected from the group consisting of

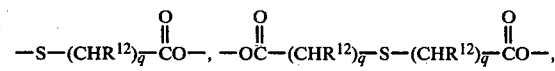

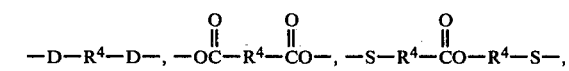

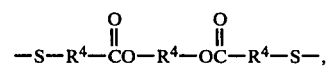

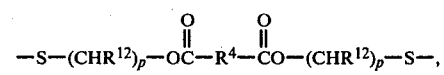

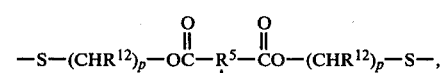

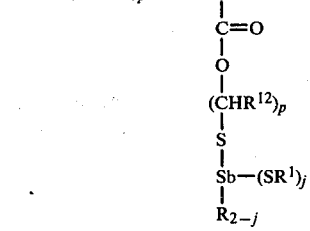

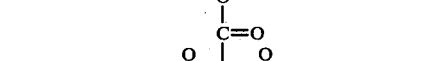

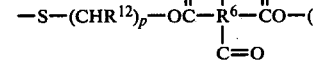

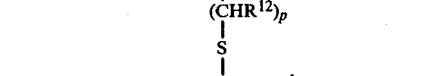

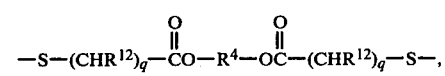

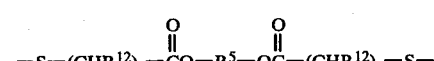

and

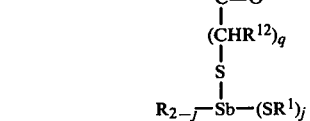

-continued

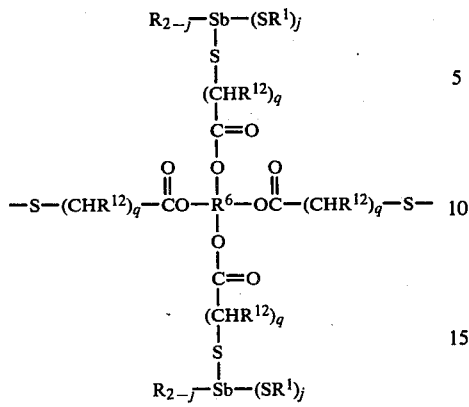

R⁴ is unsubstituted alkylene, arylene or alkenylene, or alkylene, arylene or alkenylene substituted with one or two R, —OR², —OCR¹ or —OCR⁴⁰COR¹ groups;

R⁵ is a trivalent alkyl or aryl radical;
R⁶ is a tetravalent alkyl or aryl radical;
R⁴⁰ is unsubstituted alkylene, arylene or alkenylene; or alkylene substituted with one or two —OR² or —OCR¹ groups;

D is oxygen or sulfur;
i = 1, 2 or 3;
j = 1 or 2;
m = 1 or 2 and m' = 0 or 1;
n = 1 or 2 and n' = 0 or 1;
x is 0 or 1 with the proviso that when x=0 then m+n'=2 and n+n'=2, and when x=1 then m=1, m'=0, n=1 and n'=0;
z is 1, 2 or 3;
a is 2, 3 or 4;
q is 1, 2 or 3; and
p is 2, 3 or 4; and B. an organic compound or mixture of compounds selected from compounds having the formulas:

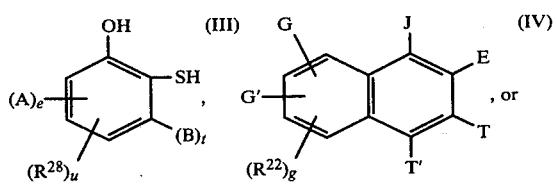

-continued

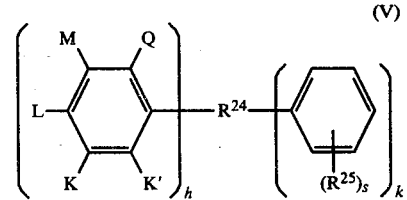

wherein
A is —H, —OH or —SH
B is —H, —OH or —SH
J is —H, —SH, —OH or R²⁶
E is —H, —OH, —SH or R²⁶
T is —H, —SH, —OH or R²⁶
T' is —H, —OH, —SH or R²⁶
G is —H, —OH or —SH
G' is —H, —SH or —OH
K is —H, —SH, —OH or R²³
K' is —H, —OH, —SH or R²³
L is —H, —SH, —OH or R²³
M is —H, —SH, —OH or R²³
Q is —H, —SH, —OH or R²³
R²⁸ is alkyl, aryl, alkenyl, alkaryl, cycloalkyl, alkoxy or halogen,
R²⁶ is alkyl, alkenyl or halogen
R²² is alkyl, alkenyl or halogen
R²³ is alkyl, alkenyl or halogen
R²⁴ is alkylene or alkenylene
R²⁵ is alkyl, alkenyl, halogen, —SH or —OH
e is 1 or 2;
t is 1 or 2;
u is 0, 1, 2 or 3;
s is 0, 1, 2 or 3;
g is 0, 1, 2 or 3;
h is 1, 2, 3 or 4;
k is 0, 1, 2 or 3;
h+k is 2, 3 or 4;
e+t+u is 2, 3 or 4;
with the proviso that (1) in formula (IV) two of groups J, E, T and T' must be an OH group and an SH group bonded directly to adjacent ring carbon atoms, and (2) in formula (V) two of groups K, K', L, M and Q must be an OH group and an SH group bonded directly to adjacent ring carbon atoms.

3. The stabilizer composition of claim 2 wherein the organic antimony compound or mixture of organic antimony compounds is according to formula (I) wherein i=3 and R¹ is —(CHR¹²)z—COOR² where R¹² is —H or alkyl, z=1 or 2 and R² is alkyl.

4. The stabilizer composition of claim 2 wherein the organic compound or mixture of organic compounds is according to formula (III) where e=0, R²⁸ is alkyl, u=0 or 1 and t=0.

5. A polymer composition comprising a halogen-containing organic polymer normally susceptible to heat induced deterioration and an effective amount of a stabilizer composition according to claim 1.

6. A pipe comprising a halogen-containing organic polymer normally susceptible to heat induced deterioration and an effective amount of a stabilizer composition according to claim 1.

* * * * *